United States Patent [19]

Stopper

[11] 3,828,202

[45] Aug. 6, 1974

[54] LOGIC CIRCUIT USING A CURRENT SWITCH TO COMPENSATE FOR SIGNAL DETERIORATION

[75] Inventor: Herbert Stopper, Orchard Lake, Mich.

[73] Assignee: Burroughs Corporation, Detroit, Mich.

[22] Filed: Feb. 20, 1973

[21] Appl. No.: 333,705

Related U.S. Application Data

[62] Division of Ser. No. 159,990, July 6, 1971, Pat. No. 3,746,885.

[52] U.S. Cl. .................. 307/218, 307/237, 307/264, 307/270, 307/299 A

[51] Int. Cl.... H03k 19/24, H03k 19/30, H03k 5/08

[58] Field of Search ........... 307/213, 214, 215, 218, 307/264, 268, 289, 272, 299 A; 328/168, 169, 172, 173

[56] References Cited

UNITED STATES PATENTS

| | | | |
|---|---|---|---|
| 3,015,733 | 1/1962 | Vignos et al. | 307/218 X |
| 3,058,008 | 10/1962 | Clapper | 307/218 |
| 3,283,170 | 11/1966 | Buie | 307/299 A |
| 3,283,180 | 11/1966 | Pressman | 307/215 |
| 3,351,782 | 11/1967 | Narud et al. | 307/218 X |
| 3,416,003 | 12/1968 | Walker | 307/218 X |
| 3,431,505 | 3/1969 | D'Agostino | 330/30 D X |
| 3,479,524 | 11/1969 | Lawless | 307/218 X |
| 3,629,610 | 12/1971 | Wilhelm | 307/218 |
| 3,679,917 | 7/1972 | Bryant et al. | 307/218 X |
| 3,719,830 | 3/1973 | Ananiades | 307/299 A X |

OTHER PUBLICATIONS

Thompson, "Logic Principles for Multi-Emitter Transistors," Electronics (pub.), pp. 25–29; 9/13/1963.
Stewart, "Hysteresis Memory Arrangement," Sheets 1 & 2 of 2, RCA TN No.: 686, 1/1967.

*Primary Examiner*—Rudolph V. Rolinec
*Assistant Examiner*—L. N. Anagnos
*Attorney, Agent, or Firm*—Charles P. Padgett, Jr.; Edwin W. Uren; Edward G. Fiorito

[57] ABSTRACT

An improved logic circuit comprising an input semiconductor, an output semiconductor and a current switch connected therebetween to compensate for signal deterioration in the logic circuit. The input semiconductor is biased to remain unsaturated in response to a binary signal swing at an input terminal. In an AND gate, the input semiconductor is a multi-emitter transistor; in an OR gate, the input semiconductor is a plurality of transistors.

10 Claims, 9 Drawing Figures

PATENTED AUG 6 1974

3,828,202

SHEET 2 OF 3

LOGIC CIRCUIT USING A CURRENT SWITCH TO COMPENSATE FOR SIGNAL DETERIORATION

This is a division, of application Ser. No. 159,990, filed July, 6, 1971, now U.S. Pat. No. 3,746,885.

BACKGROUND OF THE INVENTION

This invention relates to electrical circuits and, more particularly, to a logic circuit that is well-suited for use as a basic building block in the implementation of binary logical operations and is well-suited for fabrication as an integrated circuit.

Among the many available types of basic logic circuits packaged in integrated circuits are emitter-coupled logic (ECL), direct-coupled transistor logic (DCTL), diode-transistor logic (DTL), transistor-transistor logic (TTL), and complementary transistor logic (CTL). To perform complex logical operations such as those required in a digital computer, the basic logic circuits are electrically connected in long chains. The signal at the output of the chain is a logical function of the binary signals applied to the input of the chain. Because of these long chains of logic circuits, the binary output signal swing of each logic circuit must be equal to or greater than the binary input signal swing in order to prevent deterioration of the signals propagating through long chains and to provide an adequate noise margin.

In selecting the particular type of basic building block to be used, the advantages and disadvantages of the various types must be considered. In some types of logic circuits such as standard ECL, the transfer characteristic, i.e., the output signal as a function of the input signal is stepped, i.e., the transition from one binary value to the other at the output occurs in response to a very small change of the signal at the input. This has the disadvantage of increasing the delay time of the logic circuit and, in addition, gives rise to circuit ringing due to the interaction between adjacent logic circuits. Although the CTL type of logic circuit has a sloped rather than a stepped transfer characteristic and does not involve saturated transistors, its transfer characteristic is attenuating, i.e., the binary signal swing at the output is smaller than the binary signal swing at the input.

It is also an important advantage for a logic circuit to have a wired-OR capability, i.e., to be able to perform the logical OR function without a separate logic circuit by directly wiring together the logic circuit outputs to be OR-ed. Logic circuits such as TTL and some ECL do not have a wired-OR capability. From the point of view of packaging a logic circuit as an integrated circuit, it is also advantageous to employ transistors of the same conductivity type. Some logic circuits, such as CTL, are implemented with transistors of complementary conductivity types. From the point of view of ease of design and visualization, it is advantageous to work with logic circuits that perform direct logical functions, i.e., AND and OR, rather than complementary logical functions, i.e., NAND and NOR.

SUMMARY OF THE INVENTION

The invention concerns a basic logic circuit that has all of the advantages above enumerated, and none of the disadvantages. The logic circuit comprises input means and output means such that the output signal is a logical function of the signals at the input terminals, and means coupled therebetween to maintain the swing of the output voltages above the input signal swing thus compensating for signal deterioration.

In an AND gate, the input means may be a multi-emitter transistor and in an OR gate, the input means may be a plurality of transistors. In both gates, the input transistor may be coupled by an output emitter-follower transistor stage to an output terminal. The output terminal is optionally clamped to a low reference potential when the current flowing through the output emitter-follower transistor stage drops below a predetermined minimum value. Both gates have a wired-OR capability, are constructed from transistors of the same conductivity type, and perform a direct logical function.

The means to compensate for deterioration may include a current switch which may be placed either in series or in parallel with the rest of the circuit between the input and output transistors. A constant current path is set up through the current switch and, upon receiving the appropriate signal from the logical gating portion of the circuit the current through the switch is transferred to the output signal amplifier.

BRIEF DESCRIPTION OF THE DRAWINGS

The features of several specific embodiments of the present invention are illustrated in the drawings wherein like reference numerals identify like elements and in which.

DETAILED DESCRIPTION OF THE PREFERRED EMBODIMENT

Figure 1:
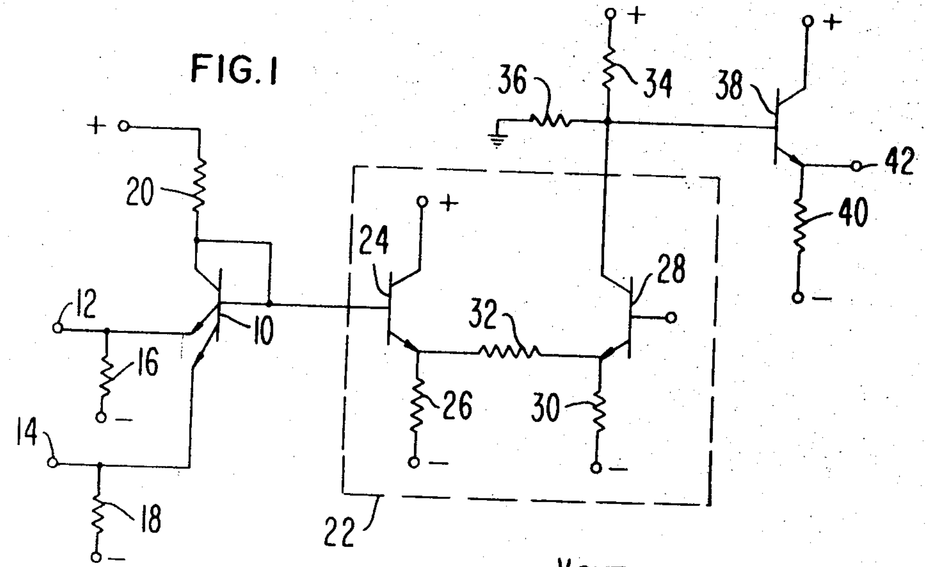
FIG. 1 is a schematic circuit diagram of one embodiment of an AND gate incorporating the principles of the present invention.

In FIG. 1 there is illustrated an AND gate according to the principles of the present invention. The AND gate comprises a multi-emitter transistor 10 which is of the NPN conductivity type. Multi-emitter transistor 10 has a plurality of emitter terminals, a single base terminal and a single collector terminal. The collector may be connected to the base to eliminate transistor gain. Input terminals 12 and 14 are directly connected to respective emitters of the multi-emitter transistor 10. A first resistor 16 connects input terminal 12 to a negative bias potential. A resistor 18 connects input terminal 14 to a similar negative bias. The collector of transistor 10 is coupled via resistor 20 to a source of positive potential.

The base of transistor 10 is directly coupled to a means for compensating for signal deterioration 22. In a preferred embodiment this means 22 comprises a current switch. The base of transistor 10 is directly coupled to part of said means 22, specifically to the base of a transistor 24. The emitter of transistor 24 is coupled through a resistor 26 to a source of negative bias. The means 22 also includes a second transistor 28 having its emitter coupled through a resistor 30 to a similar source of negative potential. Transistors 24 and 28 are of the NPN conductivity type. Another resistor 32 is directly connected between the two emitters of transistors 24 and 28. Positive bias is coupled to the collector of transistor 24 and a positive bias $V_1$ is coupled to the base of transistor 28. The collector of transistor 28 is coupled through a resistor 34 to a source of positive potential. Connected between the collector of transistor 28 and the resistor 34 is a resistor 36; the end of resistor 36 not coupled to the collector of transistor 28 is grounded.

The emitter-base junctions of transistor 10 are forward bias in a non-saturating condition. A reverse bias is provided between the collector and the base of transistor 10.

The junction of the collector of transistor 28 and resistors 34 and 36 is coupled to the base of an emitter-follower transistor 38. The collector of transistor 38 is connected to a positive bias, the emitter is coupled through a resistor 40 to a source of negative bias and the output is taken from the emitter at terminal 42. NPN transistor 38 is biased so that it operates as an emitter-follower without becoming cut off or saturated at any time. The signal at output terminal 42 follows the signal at the collector of transistor 10 except for a small base-emitter voltage drop at transistor 38.

The operation of the improved logic circuit will now be explained. The emitter-to-base junctions of transistor 10 perform the logical AND function with respect to the binary signals applied to input terminals 12 and 14. When the signal applied to input terminal 12 and/or 14 is below a predetermined low level the corresponding emitter-to-base junction (or junctions) of transistor 10 remain forward biased; the collector of transistor 10 is driven to a low voltage level and the base-emitter junction of transistor 24 becomes reverse-biased. Then current ceases to flow across the base-emitter junction of transistor 24 making the emitter of transistor 24 more negative and, through resistor 32, making the emitter of transistor 28 more negative. The more negative emitter of transistor 28 forward biases the base-emitter junction of transistor 28 thus making the collector of transistor 28 more negative. This, in turn, draws less current through resistor 34 to the base of transistor 38. The lower voltage at the base of transistor 38 makes the voltage at the emitter of transistor 38 more negative than in the absence of the current switch from the circuit. Thus, deterioration at output terminal 42 is compensated for by increasing the negative voltage swing.

When the binary signals applied to input terminals 12 and 14 are both above a predetermined high input level, both emitter-to-base junctions of transistor 10 are cut off and the collector of transistor 10 is at a predetermined high level. Transistor 28 becomes cut off and all the current through resistor 34 appears at the base of transistor 38. The voltage at the base of transistor 38 increases and the voltage at the emitter terminal of transistor 38 reaches a high level. The increased voltage at the base of transistor 38 causes more current to be drawn across the base-to-emitter junction of transistor 38 than would flow across that junction in the absence of the current switch. Thus, deterioration of the output signal at a high level is eliminated by the addition of the current switch which provides an increased output voltage swing for the high level output voltage. Thus, the logic circuit of FIG. 1 performs a direct AND function. For signals at input terminals 12 and 14 between the predetermined high and low input levels, the level at output 42 varies approximately linearly, i.e., the logic circuit has a sloping transfer characteristic with the output voltage swing being increased by the current switch. In summary, the emitter-to-base junctions of transistor 10 perform the logical AND functions; transistor 10 with its current switch provides a controlled amplification without circuit deterioration.

Figure 2:
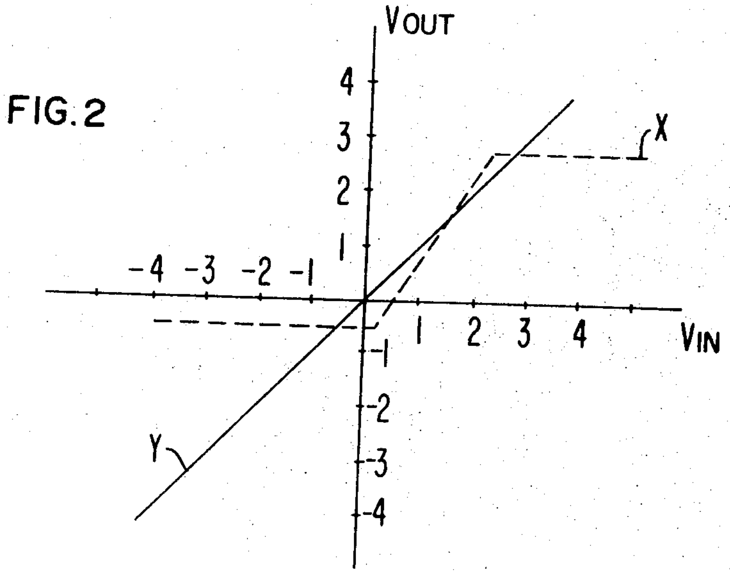
FIG. 2 is a graph showing the switching characteristics of the gate of FIG. 1.

Reference is made to FIG. 2 for a graph of a typical transfer characteristic of the logic circuit of FIG. 1. The abscissa $V_{in}$ represents the signal level in volts at input terminal 12 and, assuming that the signal level at input terminal 14 is above the predetermined high level, for example, +2.0, the ordinate $V_{out}$ represents the signal in volts at the output terminal 42. The dashed line X represents the actual transfer characteristic of the logic circuit made according to the principles of the present invention; the solid line Y represents the unity amplification slope or ideal transfer characteristic. When the signal level at input terminal 12 is below the predetermined low level input of 0.2 volts, output terminal 42 is at the predetermined low level output of −0.4 volts. When the signal level at input terminal 12 is above the predetermined high input level of 2 volts, output terminal 42 is at the predetermined high output level of 2.4 volts. When the signal level at input terminal 12 is between +0.2 and +2.0 volts, the signal level at output terminal 42 varies in approximately linear relationship with the signal level at input terminal 12. Thus, the logic circuit of FIG. 1 has a sloped transfer characteristic between the predetermined high and low input level and compensates for signal deterioration, since the predetermined high output level (2.4) is above the predetermined high input level (2.0) by 0.4 volts and the predetermined low output level (−0.4) is below the predetermined low input level (0.2) by 0.6 volts. The difference between the predetermined output and input levels represents the restoration or voltage swing created by the current switch to compensate for signal deterioration and noise. Therefore, the output signals of the logic circuit are binary in nature as long as the input signal has not deteriorated from prior logic portions of the circuit and as long as the noise level does not exceed the noise margin. If the noise margin is exceeded, the input level moves into the sloping region of the transfer characteristic and the output level becomes indefinite in its binary representation which is, of course, undesirable in binary logic operation.

To obtain the transfer characteristic of FIG. 2 the parameters used in the circuit of FIG. 1 are as follows: The positive bias at each terminal is 4.8 volts with the voltage at the base of transistor 28 being 0.8 volts, the negative bias being −2.0 volts, resistors 16, 18 and 40

2K ohms, resistors 20, 26 and 36 4K ohms, resistors 30 and 32, 475 ohms and resistor 34, 800 ohms. The various transistors are all NPN type and the entire circuit may be manufactured as an integrated circuit.

Figure 3:
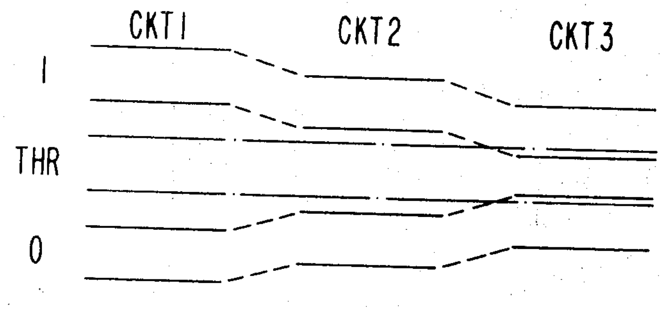
FIG. 3 is a graph showing the problems of circuit deterioration in the absence of the circuit incorporating the principles of the present invention.

The necessity and desirability of increasing the output voltage swing by the use of a current switch will become more apparent upon explanation of the chart of FIG. 3. FIG. 3 is an illustration of the voltage bands representing a "high" or "1" signal level and a "low" or "0" signal, as well as a threshold voltage band, for each of three circuits which, for the purpose of FIG. 3, are considered as being consecutive or serially arranged circuits. The discussion of the circuits parameters of FIG. 1 indicated an output voltage level of 2.4 volts for a "high" or "1" output. It must be realized, however, that 2.4 is a nominal figure and the actual voltage could, in the absence of the current switch, be 2.4 plus or minus 0.4. Thus, even a 2.0 "high" output signal is possible. If, however, a 2.0 output signal is provided then the threshold value of the next circuit must be such that a 2.0 input will recognized as a "high" input. Taking into account the voltage drop across a semiconductor junction, a 2.0 input at circuit 2, representing a "high" or "1", may be manifested as a 1.6 voltage output (2.0 plus or minus 0.4) at circuit 2 also representing a "high" or "1". However, this 1.6 output would be below threshold for a "high" input to circuit 3. Thus, the output signal has deteriorated to the point where it is no longer of sufficient magnitude to be recognized as a "high" input to circuit 3.

To compensate for and prevent this occurrence, the voltage swing at the output is increased or restored by the use of a current switch. The current switch increases the voltage swing providing a higher voltage output for the one signal and a lower voltage output for the zero signal. Of course, this need not be provided at each logical gating portion of the circuit; however, it is easier to provide this than to calculate the expected voltage drop to determine how often such voltage restoration is necessary.

Figure 4:
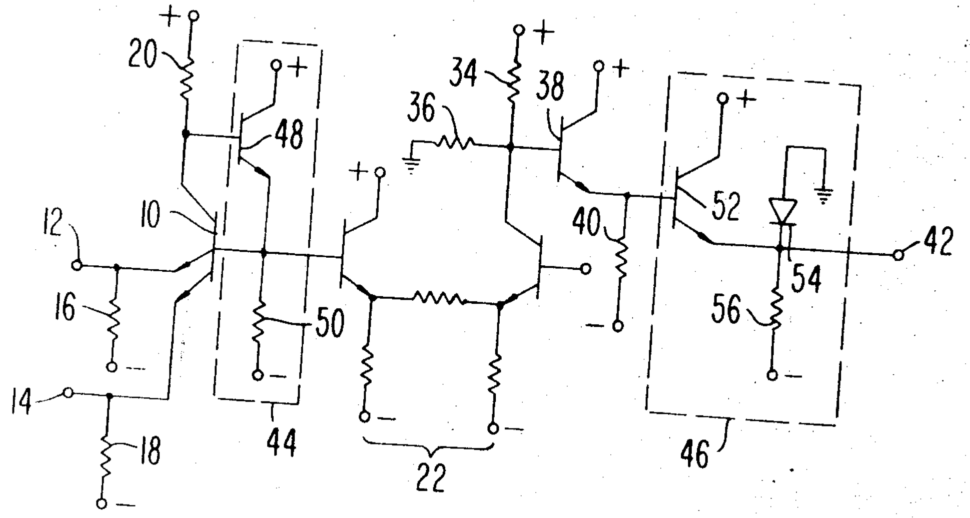
FIG. 4 is a schematic circuit illustrating modifications of the AND gate of FIG. 1.

In FIG. 4, a modification of the AND gate of FIG. 1 is shown. The modification, which is optional, may be characterized as an emitter-follower stage 44 between the multi-emitter transistor 10 and the current switch 22, and an output buffer stage 46 between the emitter-follower output transistor 38 and the output terminal 42.

The emitter-follower stage 44 includes an emitter-follower transistor 48 and a resistor 50 coupled to the emitter thereof. The base of transistor 48 is coupled to the collector of multi-emitter transistor 10. The collector of the transistor 48 is coupled to a positive voltage source and the emitter of transistor 48 is also connected to the bases of multi-emitter transistor 10 and first current switch transistor 24. Resistor 50 is also coupled to both the bases of transistors 10 and 24 and the other end of resistor 50 is connected to a source of negative bias. This emitter-follower stage 44 serves to isolate the collector of transistor 10 from the base-to-emitter capacitance of transistor 10, thereby improving circuit speed.

As a second modification the output voltage for the logic circuit may be clamped to provide reasonably consistent output voltages in addition to the voltage swing provided by the current switch. The use of a clamp is preferable since the current switch introduces gain in the overall logic circuit which is greater than unity. The output buffer stage 46 includes a transistor 52, diode 54 and a resistor 56 connected as follows. The base of transistor 52 is coupled to the emitter of emitter-follower transistor 38. The collector of transistor 52 is connected to a source of positive bias and the emitter of transistor 52 is coupled to the output terminal 42. Coupled between ground and the emitter of transistor 52 is a diode 54 whose cathode is connected toward ground. Coupled between a source of negative potential and the emitter of transistor 52 is a resistor 56. Circuit 46 clamps the low voltage output level. When a given minimum current flows through the emitter-follower of transistor 38, the voltage at output terminal 42 drops to a certain level at which time current begins to flow through diode 54 to transistor 52. This clamps output terminal at a predetermined level offset from ground by the voltage drop across diode 54. In the preferred mode of operation when this optional low level output clamp is used, the low level output voltage of terminal 42 does not drop below −0.7 to −0.8 volts, the natural voltage drop across the diode.

Figure 5A:
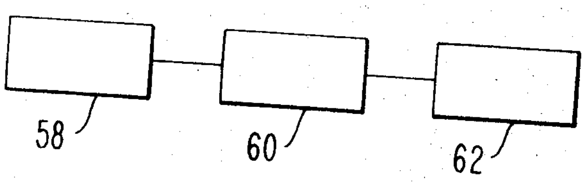
FIG. 5A is a block diagram of a current switch means in series with the gating means and the output means.

It should be remembered that the circuit of FIG. 4 is a mutli-emitter AND gate with a current switch for voltage level restoration similar to that of FIG. 1 except that two modifications are shown. With reference to FIG. 5A there is illustrated a basic block diagram of the circuit of FIGS. 1 and 4. FIG. 5A illustrates the circuit of FIGS. 1 and 4 comprising, basically, a gating or logical input 58, a current switch 60 in series with the gate 58 and an output stage 62 which has its voltage swing or voltage level restoration controlled by the current switch 60.

Figure 5B:
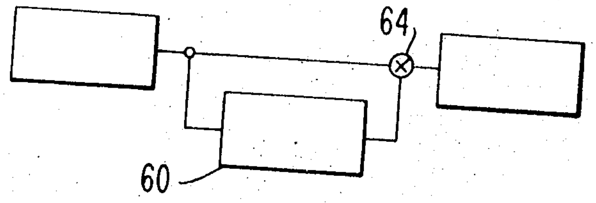
FIG. 5B is a block diagram of a current switch means in parallel with a gating means and an output means.

Referring next to FIG. 5B it may be seen that the current switch 60 may be placed in parallel with a conductive path between the logical input 58 and the output stage 62 with the addition of an appropriate adder 64.

Figure 6:
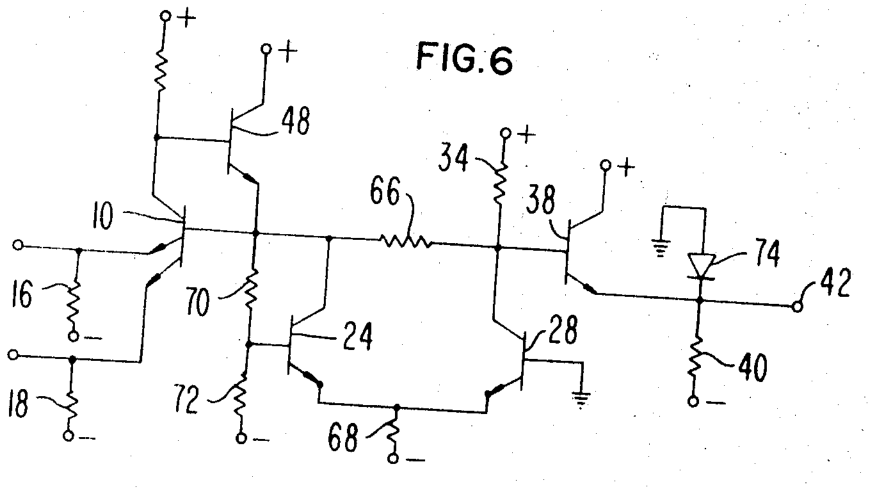
FIG. 6 is a schematic circuit diagram of another embodiment of an AND gate incorporating the principles of this invention and having current switch means in parallel with the remainder of the circuit.

With reference to FIG. 6, a preferred embodiment of this parallel current switch circuit will now be explained. FIG. 6 also includes two optional modifications, the emitter-follower stage between the input transistor 10 and the current switch and another low level output voltage clamp. Since many portions of FIG. 6 are the same as FIGS. 1 and 4 they will only be briefly repeated here. The input is a multi-emitter transistor 10 having input terminals connected to the various emitters. An emitter-follower transistor 48 may be coupled between the base and collector of transistor 10 in the same manner as discussed with respect to FIG. 4. The base of transistor 10, instead of being connected to the base of one of the current switch transistors as in the series embodiment, is coupled to the collector of the first current switch transistor 24. The collectors of the two current switch transistors 24, 28, are coupled together through a resistor 66. Then, as in the prior (series circuit) embodiments, the collector of current switch transistor 28 is coupled through a resistor 34 to a source of positive potential and also to the base of emitter-follower transistor 38, the output transistor. The emitters of the two current switch transistors 24, 28, are tied together and coupled through a resistor 68 to a source of negative potential. A voltage divider, comprised of resistors 70 and 72, couples the base of multi-emitter transistor 10 to a source of negative potential and the base of the first current switch transistor 24 is tied to the junction of the two voltage divider transistors. The base of current switch transistor 28 is grounded. The low level clamp 46 of FIG. 4 is replaced merely by the diode 74 of FIG. 6 with the anode connected to the emitter of output emitter-follower transistor 38 and the cathode grounded.

The circuit of FIG. 6 provides a multi-emitter input transistor stage which provides the logical gating function, a series connection to an emitter-follower output and a current switch in parallel with the rest of the circuit to maintain voltage level restoration between the input signal and the output signal. At high input, current flows from source of potential through resistor 34 across the base to emitter junction of transistor 38 to provide a high level output at terminal 42. When the low level signals are applied at one or more of the input terminals, the multi-emitter transistor 10 is forward biased, causing a low level output at terminal 42 as previously explained, and also increasing the current across the collector-to-base junction of transistor 10 causing a corresponding decrease in the current from the base to the emitter of the first transistor 24 of the current switch. This current decrease turns on transistor 28 thus less current flows from resistor 34 through transistor 38 than in the absence of the current switch. This provides the low level output voltage swing. The optional feature of the low level clamp 74 (or a different clamp such as that shown in FIG. 4) clamps this low level voltage once a predetermined potential is reached.

When the signal at both input terminals 12 and 14 is positive above a predetermined upper level multi-emitter transistor 10 is cut off. This raises the current at the base of transistor 38 causing a high level output at terminal 42 as previously explained. Cutting off transistor 10 turns on transistor 24 and cuts off transistor 28. This raises the current at the base of transistor 38 even more, to a steady value, causing a voltage swing or boost at emitter of transistor 38 stabilizing the voltage at terminal 42 at a level above the high output level in the absence of the current switch. The "adder" function is provided by the current flowing in one direction or the other through resistor 66 coupled with the current flowing through resistor 34 either to the base of transistor 38 or through transistor 28 depending upon the high or low input signals, respectively. From the explanation of the operation of the circuit with the current switch in parallel it should be realized that the current switch operates as a bi-polarity switch, i.e., the current switch itself serves to increase or decrease current through the output transistor 38. It must be appreciated that either transistor 24 or transistor 28 in the current switch could be replaced by a diode to provide a uni-polar or single polarity switch. In such a situation the current switch adds "nothing" in one direction and it is only the effective current through resistor 66 which is coupled to the output transistor. In the other direction the effective current through resistor 66 is increased or diminished by the operation of the transistor in the current switch.

In the preferred mode of operation for the circuit of FIG. 6, those components having like numerals with the components of FIG. 1 have the same representative values except that the base of transistor 28 is grounded and resistor 34 is 1.2K ohms. In addition, the new resistors have the following values: Resistor 66, 300 ohms, resistor 68, 240 ohms, resistor 70, 1.8K ohms and resistor 72, 2.0K ohms.

Figure 7:
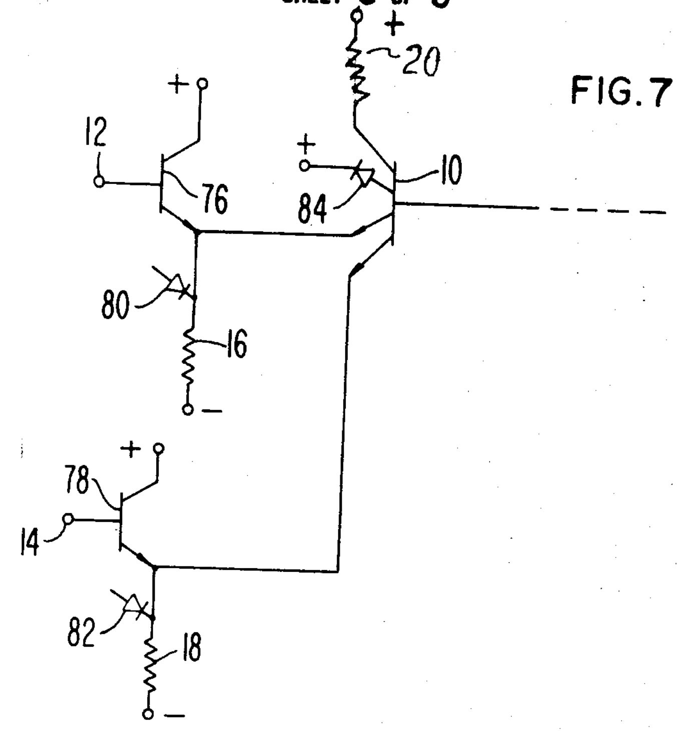
FIG. 7 is a partial schematic circuit diagram of additional modifications to the circuit of the present invention.

With reference now to FIG. 7 additional modifications of the AND gate of FIGS. 1, 4 and 6 are shown. In FIG. 7, the input terminals 12 and 14 are coupled to the emitters of multi-emitter transistor 10 by input emitter-follower transistors 76, 78, respectively. This presents a high input impedance to the logic circuit and amplifies the emitter voltage. Thus, both low current and low voltage may be used to drive the logic circuit. The bases of transistors 76 and 78 are coupled to the input terminals 12 and 14, respectively. The collectors of these two transistors are each connected to a positive source of bias and the emitters are connected to the emitters of the multi-emitter transistor 10. Each emitter of the input emitter-follower transistor also coupled through its respective input resistor 16, 18, to a source of negative bias.

Also shown in FIG. 7 is a third alternative form for clamping the low level output voltage. In this embodiment, the low level output voltage clamp is characterized by a diode connected to the emitter of the input emitter-follower transistors 76, 78. In each case, these diodes, 80, 82, are poled with their anodes grounded and their cathodes coupled to the emitter of the input emitter-follower transistor.

We have yet another embodiment of the high output voltage clamp shown in FIG. 7. This is shown as a diode 84 clamped to a third emitter of the multi-emitter transistor 10. This third anode of diode 84 is connected to a suitable positive bias.

Figure 8:
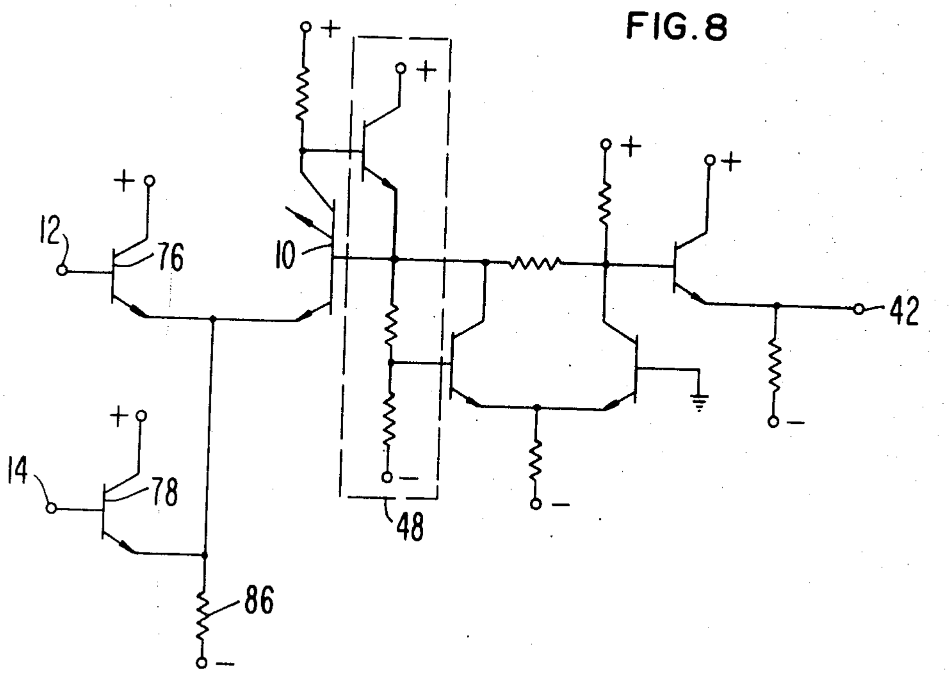
FIG. 8 is an OR gate incorporating the principles of the present invention.

In FIG. 8 an OR gate is shown. For convenience, the input emitter-follower transistors 76 and 78 are illustrated along with the emitter-follower intermediate stage 48 of FIG. 6. Furthermore, the current switch is shown as being in parallel similar to the embodiment of FIG. 6. The input terminals 12 and 14 are coupled through the input emitter-follower transistors 76 and 78 to a single emitter of the multi-emitter transistor 10. This common emitter is also provided with a source of negative bias through a resistor 86. In performing the OR function only one emitter of the multi-emitter transistor 10 is employed; thus, a single emitter transistor or conventional transistor would suffice.

When the signal levels at input terminals 12 and 14 are both at the predetermined low level, both input emitter-follower transistor 76, 78, are cut off, transistor 10 is conducting and the output terminal 42 is at the predetermined low level. When the signal level at input terminal 12 or 14 or both is at the predetermined high input level, the corresponding emitter-follower transistor 76, 78 (or both), is conducting, transistor 10 is cut off and the output terminal 42 is at the predetermined high output level.

The described embodiments of the invention are only considered to be preferred and illustrative of the inventive concept and, as such, are not to be considered as restricting the scope of the invention. Various arrangements may be made by one skilled in the art without departing from the spirit and scope of the present invention.

As an example of another modification, resistor 66 of FIG. 6 may be replaced by two resistors 66A and 66B with resistor 66A being approximately one-fifth the value of resistor 66B and resistor 66A being located closer to the base of transistor 10. The emitter of transistor 48 would be coupled in between resistors 66A and 66B. This provides an unbalanced gain for the current switch so more voltage is added at a high input signal but a smaller voltage is subtracted at a low input signal. The purpose of this modification would be with a heavy output load there would be a larger base current and one emitter-follower output stage could not reduce this base current. Thus, at low signals there is a loss in the output base current which is desirable and therefore voltage across resistor 66B is sufficient. However, at high signals the loss in output base current must be added back by the voltage across resistors 66A and 66B.

In addition, the low level clamp need not be at the output but may be added in parallel with current switch such as the junction of resistors 34 and 66 in FIG. 6. Such a clamp, coupled to a bias network, limits output of output transistor 38 to ground and also limits the base voltage of multi-emitter transistor. The purpose for this would be limiting current in the transistor 48 in order to prevent feedback loop oscillation. At a high output transistor 10 is off and the feedback loop is open to prevent oscillation and at low output transistor 10 is on but transistor 48 is off which again opens the loop thereby preventing oscillation.

Furthermore, the various clamps, input emitter-follower transistors, output emitter-follower transistors and intermediate or buffer emitter-follower transistors may be selectively employed in various combinations depending upon the circuit needs of the individual user.

What is claimed is:

1. An improved logic circuit comprising:

input semiconductive means for receiving an input signal, said input means having a base terminal, a collector terminal and an emitter terminal, output semiconductor means having a base terminal, a collector terminal and an emitter terminal, the output signal being taken from said emitter terminal, and current-switching means for compensating for signal deterioration in said logic circuit, said current-switching means including a first and a second current-switching semiconductive means each having a base terminal, a collector terminal and an emitter terminal, the base of said first current-switching semiconductive means being coupled to the base of said input semiconductive means and the collector of said second current-switching semiconductive means being coupled to the base of said output semiconductive means, said current-switching means further including unbalanced resistive means coupling the emitter of said first current-switching semiconductive means to the emitter of said second current-switching semiconductive means for reducing the gain of said current-switching means, for linearizing the transfer characteristic of the logic circuit and for insuring unbalanced operation of said current-switching means thereby allowing said logic circuit to operate with relatively large signal swings.

2. The improved logic circuit of claim 1 wherein said unbalanced resistive means includes:

a first resistive means coupled between the emitter of said first current-switching semiconductive means and the emitter of said second current-switching semiconductive means, second resistive means coupled between the emitter of said first current-switching semiconductive means and a source of negative potential, and third resistive means coupled between the emitter of said second current-switching semiconductive means and said source of negative potential.

3. The improved logic circuit of claim 2 further including emitter-follower means coupled between said input semiconductive means and said current-switching means for isolating the collector terminal of said input semiconductive means from the base-to-emitter capacitance of said input semiconductive means and improving the speed of operation of said logic circuit, said emitter-follower means including a transistor having its base coupled to the collector of said input semiconductor means and an emitter coupled between the base of said input semiconductive means and the base of said first current-switching semiconductive means.

4. The improved logic circuit of claim 3 further including output buffer means coupled between the emitter of said output semiconductive means and the output of the improved logic circuit for clamping the circuit output to a predetermined level offset from ground.

5. The improved logic circuit of claim 4 wherein said output buffer means includes an emitter-follower transistor having its base coupled to the emitter of said output semiconductive means, its collector coupled to a positive voltage source, and its emitter coupled to said circuit output and wherein said output buffer means further includes a clamping diode having its anode coupled to ground and its cathode coupled to the emitter of said emitter-follower transistor and wherein said output buffer means further includes a resistor coupled between the emitter of said emitter-follower transistor and the source of negative potential.

6. An improved logic circuit for providing a relatively large voltage swing and an approximately unity transfer characteristic between the input and output signals thereof comprising:

a multiple emitter input transistor having a base electrode, a collector electrode and at least one emitter electrode for receiving input signals, an emitter-follower output transistor having a base electrode, a collector electrode, and an emitter electrode, said emitter electrode serving as a circuit output, and current-switching means serially coupled between the base of said multiple emitter input transistor and the base of said emitter-follower output transistor, said current-switching means including a first means responsive to the presence of an input signal indicative of a first logic state for defining a first current path and increasing the level of the output signal to a level indicative of said first logic state and to a value a predetermined amount greater than the value of said input signal, and said current-switching means further including a second means responsive to the presence of an input signal indicative of a second logic state for defining a second current path and decreasing the level of said output signal to a level indicative of said second logic state and to a value a predetermined amount below the value of said input signal indicative of said second logic state.

7. The logic circuit according to claim 6 wherein said current-switching means includes a current switch in series between the base of said multiple emitter transistor and the base of said emitter-follower output transistor, said current switching means including a first and second transistor and resistive means coupling the emitter of said first transistor with the emitter of said second transistor for creating an unbalanced amplifier stage.

8. The logic circuit according to claim 7 wherein the resistive means of said current-switching means further includes:

a first resistor coupling the emitter of said first current-switching transistor to the emitter of said second current-switching transistor, a second resistor coupled between the emitter of said first current-switching transistor and a source of negative potential, and a third resistor unequal to said second resistor for coupling the emitter of said second current-switching transistor to said source of negative potential.

9. The logic circuit of claim 7 further including:

means for clamping the circuit output, and means coupled between the collector of said multi-emitter input transistor and the base of said first current-switching transistor for improving the speed of operation of said logic circuit.

10. The logic circuit of claim 9 wherein said means for improving the speed of the logic circuit includes;

an emitter-follower transistor having its base coupled to the collector of said multi-emitter input transistor and its emitter coupled to the base of said first current-switching transistor for isolating the collector of said multi-emitter input transistor from the base-to-emitter capacitance of said multiple emitter input transistor and a resistor coupled between the base of said first current-switching transistor and a source of negative potential, and wherein said clamping means includes;

A second emitter-follower output transistor having its base coupled to the output of said first emitter-follower output transistor, its collector coupled to a source of positive potential and its emitter coupled to said circuit output, a diode having its cathode coupled to the emitter of said second emitter-follower transistor and its anode coupled to ground, and resistive means coupled between the emitter of said second emitter-follower transistor and said source of negative potential.

* * * * *